US010161446B2

United States Patent
Morreale (10) Patent No.: US 10,161,446 B2
(45) Date of Patent: Dec. 25, 2018

(54) PLAIN SELF-CENTERING BEARING

(71) Applicant: SAFRAN AIRCRAFT ENGINES, Paris (FR)

(72) Inventor: Serge René Morreale, Moissy-cramayel (FR)

(73) Assignee: Safran Aircraft Engines, Paris (FR)

( * ) Notice: Subject to any disclaimer, the term of this patent is extended or adjusted under 35 U.S.C. 154(b) by 100 days.

(21) Appl. No.: 15/528,143

(22) PCT Filed: Nov. 17, 2015

(86) PCT No.: PCT/FR2015/053101
§ 371 (c)(1),
(2) Date: May 19, 2017

(87) PCT Pub. No.: WO2016/079415
PCT Pub. Date: May 26, 2016

(65) Prior Publication Data
US 2017/0328404 A1 Nov. 16, 2017

(30) Foreign Application Priority Data

Nov. 20, 2014 (FR) ...................................... 14 61242

(51) Int. Cl.
*F16C 32/06* (2006.01)
*F16C 17/02* (2006.01)
(Continued)

(52) U.S. Cl.
CPC ............ *F16C 32/067* (2013.01); *F01D 11/04* (2013.01); *F16C 17/02* (2013.01);
(Continued)

(58) Field of Classification Search
CPC ........ F16C 32/00; F16C 32/067; F01D 11/00; F01D 11/04; F16J 15/00; F16J 15/342
See application file for complete search history.

(56) References Cited

U.S. PATENT DOCUMENTS 2,449,297 A * 9/1948 Hoffer ................. F16C 32/0659
384/115
4,105,267 A 8/1978 Mori
(Continued)

FOREIGN PATENT DOCUMENTS

CN 103291738 9/2013
DE 2711983 A1 9/1977
(Continued)

OTHER PUBLICATIONS

International Search Report issued in corresponding International Application No. PCT/FR2015/053101, dated Feb. 15, 2016 (6 pages—English translation included).
English translation of Chinese Office Action in corresponding Chinese Application No. 201580063253.6, dated Aug. 3, 2018, 2018 (6 pages).

*Primary Examiner* — Mark J Beauchaine
(74) *Attorney, Agent, or Firm* — Bookoff McAndrews, PLLC (57) ABSTRACT

A mechanical assembly includes two mechanical parts rotatable relative to each other. A first part is provided with a cylindrical cavity, a second part (34) has at least one cylindrical portion engaged in the cylindrical cavity of the first part, and a gap separates the cylindrical portion and the wall of the cylindrical cavity so as to allow relative movement in rotation between the first part and the second part (34). A lubricant distribution network (37, 38) is configured for feeding the gap with a fluid lubricant so as to form a fluid bearing. A first surface (34s) selected from the inside surface of the cylindrical cavity of the first part and the outside surface of the cylindrical portion of the second part is provided with at least two lubricant admission orifices.

11 Claims, 6 Drawing Sheets

(51) Int. Cl.
   *F16C 33/10* (2006.01)
   *F01D 11/04* (2006.01)
   *F16J 15/34* (2006.01)
   *F01L 11/00* (2006.01)
   *F16C 32/00* (2006.01)
   *F16J 15/00* (2006.01)

(52) U.S. Cl.
   CPC ...... *F16C 33/1055* (2013.01); *F16C 33/1065* (2013.01); *F16C 33/1085* (2013.01); *F16J 15/342* (2013.01); *F01L 11/00* (2013.01); *F16C 32/00* (2013.01); *F16C 2240/42* (2013.01); *F16C 2360/23* (2013.01); *F16C 2361/61* (2013.01); *F16J 15/00* (2013.01)

(56) References Cited

U.S. PATENT DOCUMENTS

| 8,657,714 | B1 | 2/2014 | Ghanime et al. |
|---|---|---|---|
| 2012/0108380 | A1 | 5/2012 | Dinter et al. |

FOREIGN PATENT DOCUMENTS

| DE | 19826460 | A1 | 12/1999 |
|---|---|---|---|
| EP | 1890045 | A1 | 2/2008 |
| FR | 3010449 | A1 | 3/2015 |
| GB | 1161895 | A | 8/1969 |
| JP | H06-173954 | A | 6/1994 |
| JP | H08-128310 | A | 5/1996 |

\* cited by examiner

PLAIN SELF-CENTERING BEARING

CROSS-REFERENCE TO RELATED APPLICATIONS

This application is the U.S. national phase entry under 35 U.S.C. § 371 of International Application No. PCT/FR2015/053101, filed on Nov. 17, 2015, which claims priority to French Patent Application No. 1461242, filed on Nov. 20, 2014, the entireties of which are herein incorporated by reference.

FIELD OF THE INVENTION

The present disclosure relates to a mechanical assembly of two mechanical parts rotating one relative to the other and enabling a self-centering fluid bearing to be obtained.

Such a mechanical assembly is useful in particular within a transmission member, e.g. of the epicyclic gear train type. In particular, such an invention may find an application in the field of aviation, within airplane turbojets or helicopter turboshaft engines: it may be applied in particular to the reduction gearing of those turbojets that have gearing.

BACKGROUND

The turbojets conventionally found nowadays in the field of civil aviation are two-spool bypass turbojets. Nevertheless, because of the ever-increasing constraints on operating costs, closely tied to the cost of fuel, which is nowadays very high, new projects have been proposed for turbojets that benefit from smaller specific consumption.

One promising option consists in fitting the turbojets with speed reduction gearing interposed between the low pressure compressor and the fan: in this way, it is possible to increase the speed of rotation of the low pressure spool, thereby increasing the overall efficiency of the turbojet, while reducing the speed of the fan, thereby enabling the diameter of the fan to be increased and thus enabling the bypass ratio of the engine to be increased, while conserving a peripheral speed at the tips of the blades that is acceptable for limiting the occurrence of aerodynamic disturbances that, in particular, generate noise.

Figure 1:
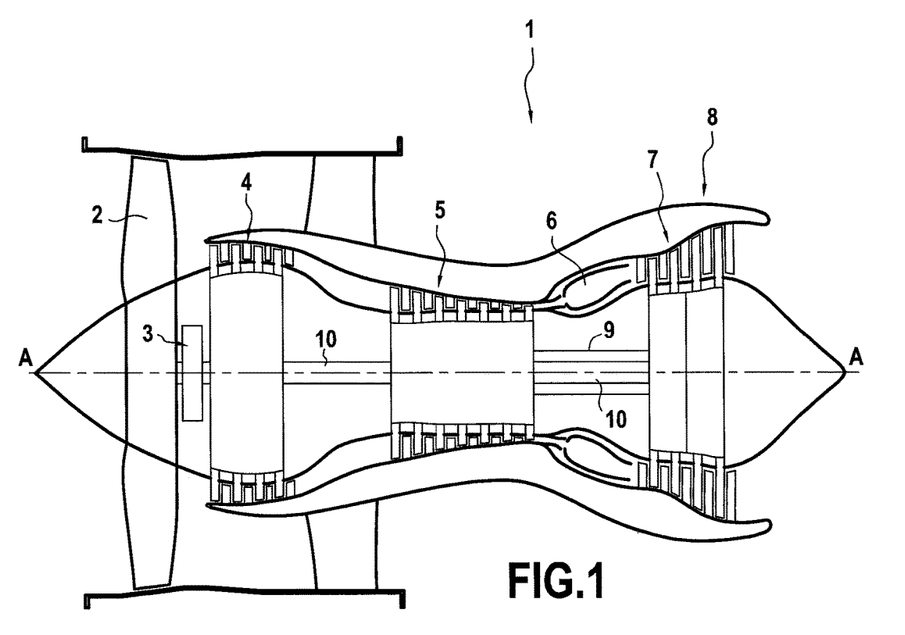
FIG. 1 is an axial section view of an example of a turbine engine with reduction gearing.

Such a bypass turbojet with reduction gearing is shown in FIG. 1, in section on a vertical plane containing its main axis A. From upstream to downstream it comprises a fan 2, reduction gearing 3, a low pressure compressor 4, a high pressure compressor 5, a combustion chamber 6, a high pressure turbine 7, and a low pressure turbine 8.

In such a turbojet 1 with reduction gearing, the high pressure turbine 7 drives the high pressure compressor 5 via a high pressure shaft 9. The low pressure turbine 8, also referred to as a fast turbine, drives the low pressure compressor 4 via a low pressure shaft 10. The fast turbine 8 also drives the fan 2 via the speed reduction gearing 3. In this way, the fan 2 is driven at reduced speed, which is favorable from an aerodynamic point of view, while the low pressure turbine 7 can operate at higher speed, which is favorable from a thermodynamic point of view.

Figure 2:
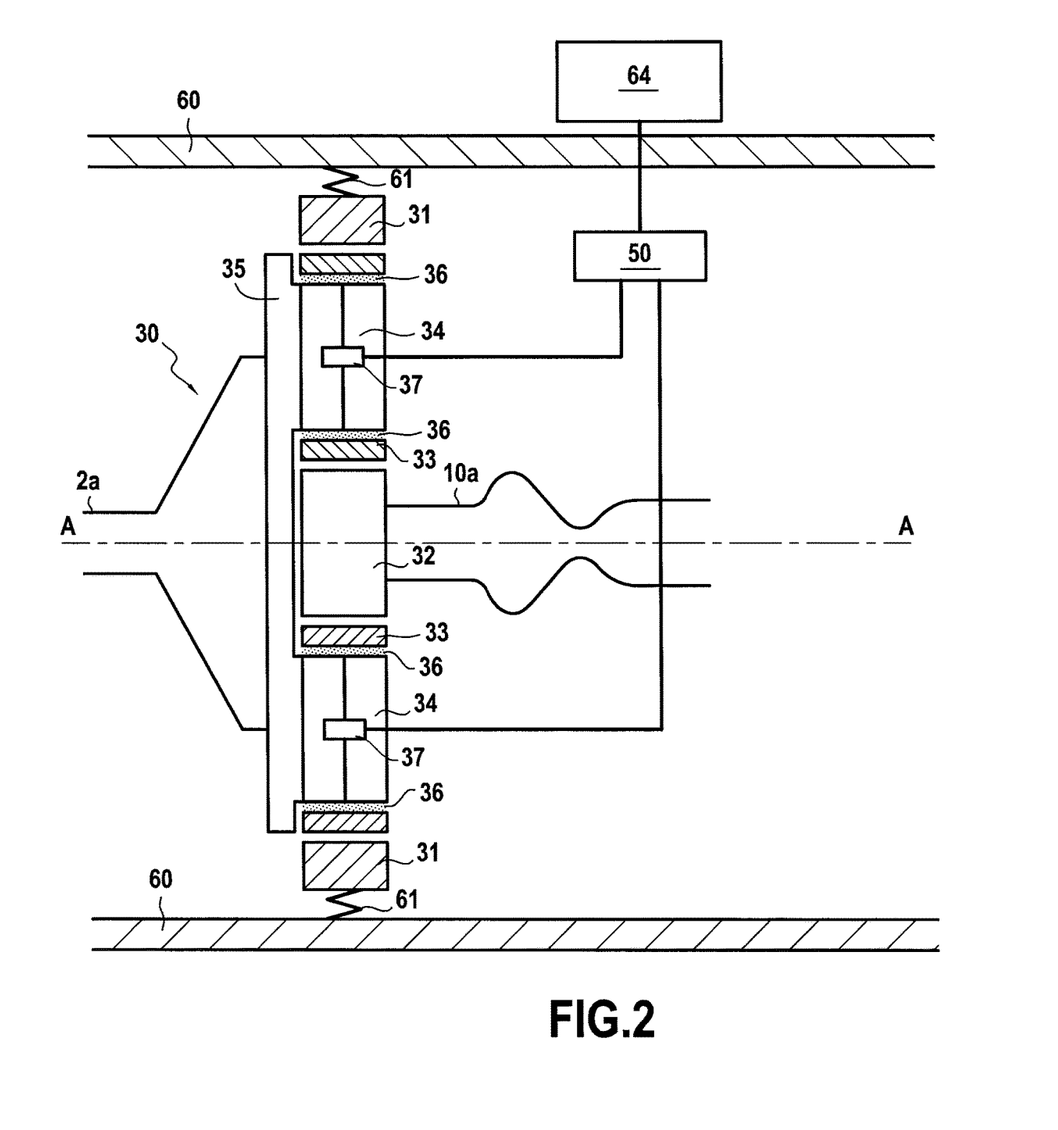
FIG. 2 is a theoretical diagram of the transmission member.

As shown in FIG. 2, the reduction gearing 3 may be an epicyclic gear train having a ring 31, a sun gear 32, and planet gears 33. The planet gears 33 are mounted to rotate on spindles 34 of a planet carrier 35: each planet gear 33 thus rotates about the axis F of the corresponding spindle 34. The bearings 36 between the planet gears 33 and their respective spindles 34 may be smooth, i.e. without any rolling mechanism, in which case they have a film of oil under pressure serving to lubricate and cool the bearings 36. An example of such an oil distribution system is given in the French patent application filed under the No. 13/58581.

In a conventional configuration, the ring 31 is fastened to the casing 60, the planet carrier 35 is coupled to the fan shaft 2a, thereby driving the fan 2, and the sun gear 32 is coupled to one end 10a of the low pressure shaft 10.

While the turbine engine is in operation, because the sun gear 32 rotates and because the ring 31 is stationary, the planet gears 33 are driven over a path combining rotation about the axis of rotation A of the epicyclic gear train and rotation about the axes F of their respective spindles 34: under such circumstances, the spindles 34 and the planet carrier 35 as a whole are driven in rotation about the axis of rotation A of the epicyclic gear train.

It can thus be understood that the forces driving the planet gears 33, together with centrifugal force, and to a lesser extent the force of gravity, lead to the planet gears 33 being moved off-center relative to the spindles 34. In particular, as a result of the driving force, the oil film is observed to be pinched behind each spindle 34.

This off-centering then has the consequence of increasing the risk of a planet gear 33 coming into contact with its spindle 34, thereby damaging the bearing.

To remedy that phenomenon, reduction gear units have been proposed in which non-uniform oil distribution is provided within the bearing in order to provide a greater quantity of oil in the zones that are the most exposed to the risk of friction.

Nevertheless, in general, such non-uniform distribution of oil is either a static correction, which therefore does not take account of the genuine state of the system, or else a dynamic correction, but requiring the provision of sensors, actuators, and electronic controllers, thereby greatly increasing the complexity and the cost of the system.

There therefore exists a real need for a mechanical assembly that is free, at least in part, from the drawbacks inherent to the above-mentioned known configurations.

SUMMARY

The present disclosure provides a mechanical assembly comprising a first part provided with a cylindrical cavity, a second part having at least one cylindrical portion engaged in the cylindrical cavity of the first part, a gap separating the cylindrical portion and the wall of the cylindrical cavity so as to allow relative movement in rotation between the first and second parts, and a lubricant distribution network configured for feeding said gap with a fluid lubricant so as to form a fluid bearing, the assembly being characterized in that a first surface selected from the inside surface of the cylindrical cavity of the first part and the outside surface of the cylindrical portion of the second part is provided with at least two lubricant admission orifices that are spaced apart from each other by not less than 120° about the main axis of the first surface; and in that the first surface also presents at least one circumferential groove extending circumferentially from the vicinity of a first lubricant admission orifice over at least 100° and in the direction of relative rotation of the second of said surfaces relative to the first surface.

By means of this configuration, it is possible to balance automatically the flowrates of lubricant to be delivered into the various zones of the fluid bearing. Specifically, when the first and second parts come closer together in a given direction, the fluid bearing becomes pinched in a corresponding zone of the gap: this pinching then restricts the flow section for lubricant leaving the lubricant admission orifice situated in the pinch zone, thereby reducing the flow rate of lubricant escaping through this orifice and consequently increasing the flow rate(s) of lubricant escaping through the other orifice(s). An increased quantity of lubricant then travels along the circumferential groove and thus delivers surplus lubricant into the zone situated upstream from the pinch zone.

Thus, when the second surface rotates, a given point thereof passes initially through the zone including surplus lubricant, and entrains a portion of this lubricant prior to reaching the pinch zone: the second surface thus benefits from increased lubrication in the pinch zone, thereby reducing the risk of the first and second surfaces coming into contact and contributing to re-centering the second surface relative to the first surface.

Naturally, this lubricant distribution system is dynamic and can balance itself automatically in the event of the pinch zone moving. Also, in the event of the mechanical assembly re-centering, the pinching disappears and the gap then possesses constant width all around the cylindrical portion of the second part: the through sections of the lubricant admission orifices then become balanced as do the lubricant feed flowrates.

Such a mechanical assembly is thus capable of maintaining and balancing a fluid bearing without any rolling device between the two parts, and can do so in a manner that is automatic and dynamic. In particular, it makes it possible to reduce the risk of contact between the two parts, whatever the off-centering that is encountered, and it contributes to re-centering the rotating part relative to its support. This procures a mechanical assembly in which the rotating part can rotate smoothly, i.e. without jolting and with minimum loss of energy.

In the present disclosure, the terms "axial", "radial", "tangential", "inner", "outer", and their derivatives are defined relative to the main axis of the transmission member; the term "circumferential" is defined relative to such a radial axis; the term "axial plane" is used to mean a plane containing the main axis of the transmission member; and the term "radial plane" is used to mean a plane perpendicular to the main axis. Also, the terms "upstream" and "downstream" are defined relative to the direction of rotation of the second surface relative to the first surface.

In certain embodiments, the first part rotates about the second part. In certain embodiments, the first part is a gear and the second part is a hub, said gear rotating about said hub.

In other embodiments, the first part is a bearing surface and the second part is a shaft, said shaft rotating within the bearing surface.

In certain embodiments, the first surface is the outside surface of the cylindrical portion of the second part and the second surface is the inside surface of the cylindrical cavity of the first part. This configuration is easier to put into place in the context of a gear rotating about a hub, even if the hub is itself moving in the reference frame of a mechanical member of greater size.

In certain embodiments, the cylindrical portion of the second part includes a lubricant reception chamber configured to receive lubricant from a lubricant source and in fluid flow connection with the lubricant admission orifices. The lubricant reception chamber and the ducts feeding lubricant to the lubricant admission orifices form part of the lubricant distribution network. This chamber makes it easy to distribute lubricant towards the various lubricant admission orifices. It can be fed with lubricant using an external distributor, e.g. a distributor of the type described in the French patent application filed under the number 13/58581.

In certain embodiments, the first surface includes in a first transverse plane first and second lubricant admission orifices that are diametrically opposite. This makes it possible to ensure effective balancing relative to a first axis.

In certain embodiments, the first surface includes in a second transverse plane different from the first transverse plane third and fourth lubricant admission orifices that are diametrically opposite. This makes it possible to ensure effective balancing relative to a second axis.

In certain embodiments, the first and second lubricant admission orifices are arranged on a straight line orthogonal to the straight line on which the third and fourth lubricant admission orifices are arranged. By means of this arrangement, the first and second balancing axes are orthogonal, thereby making re-centering of the system easier regardless of the direction in which it is off-center.

In certain embodiments, a circumferential groove extends circumferentially from the vicinity of each lubricant admission orifice over at least 100° in the direction of relative rotation of the second of said surfaces relative to the first surface. The lubricant is thus taken from each lubricant admission orifice towards a zone that is upstream from the following orifice.

In certain embodiments, the circumferential groove extends in the same transverse plane as the first lubricant admission orifice. This makes it easier to pass lubricant from the orifice towards the groove.

In certain embodiments, the upstream end of the circumferential groove is disjoint from the first lubricant admission orifice. In other words, the orifice does not open out into the bottom of the groove, but into the surface of the part. Since the orifice does not open out directly into the groove, the outlet flow section from the orifice is effectively reduced to a considerable extent in the pinch zone, thereby significantly increasing the flowrate of oil towards the other orifices.

In certain embodiments, the upstream end of the circumferential groove is distant from of the first lubricant admission orifice by less than 10°, preferably by less than 5°. This makes it easier to pass lubricant from the orifice towards the groove.

In certain embodiments, the circumferential groove extends over less than 160°. Lubricant is thus brought very close to the pinch zone.

In certain embodiments, the angular distance between the downstream end of the circumferential groove and a second lubricant admission orifice lies in the range 5° to 20°, preferably in the range 10° to 15°. This is a compromise between the advantage of bringing lubricant very close to the pinch zone and the advantage of the lubricant coming from the second orifice not penetrating into the circumferential groove of the first orifice to the detriment of its own circumferential groove.

In certain embodiments, the first surface also presents at least one longitudinal groove extending longitudinally from the downstream end of a circumferential groove. This longitudinal groove makes it possible to initiate a film of oil over a considerable length of the first surface.

In certain embodiments, the lubricant is oil.

The present disclosure also provides a transmission member, of the epicyclic gear train type, comprising a mechanical assembly according to any preceding claim, wherein the first part of the mechanical assembly is an epicyclic gear train planet gear and the second part is a spindle of an epicyclic gear train planet carrier.

This provides a transmission member, e.g. reduction gearing, in which the planet gears can benefit from self-centering smooth bearings. This ensures that the advantages of the above disclosed mechanical assembly are obtained. At the scale of the transmission member, the energy efficiency of the transmission is increased and both vibration and heating are reduced. The lifetime of the transmission member is also lengthened.

The present disclosure also provides a turbine engine including a transmission member in accordance with any of the above embodiments.

In certain embodiments, the turbine engine also includes a low-pressure turbine and a fan, and the epicyclic gear train of the transmission member also includes a sun gear and a ring.

In certain embodiments, the ring is fastened to the casing, preferably using a flexible connection, the sun gear is coupled to the low-pressure turbine, via a flexible connection, and the planet carrier is coupled to the fan, preferably via a stiff connection. The term "flexible connection" it is used for a connection that is more flexible in bending then the connection that is said to be "stiff".

The above-described characteristics and advantages, and others, appear on reading the following detailed description of embodiments of the mechanical assembly and of the transmission member that are proposed. The detailed description refers to the accompanying drawings.

BRIEF DESCRIPTION OF THE DRAWINGS

The accompanying drawings are diagrammatic and seek above all to illustrate the principles of the invention.

In these drawings, from one figure to another, elements (or portions of an element) that are identical are identified by the same reference signs. In addition, elements (or portions of an element) that belong to different embodiments but that have analogous functions are identified in the figures by numerical references increased by 100, 200, etc.

DETAILED DESCRIPTION

In order to make the invention more concrete, an example transmission member is described in detail below with reference to the accompanying drawings. It should be recalled that the invention is not limited to this example.

FIG. 1 shows a bypass turbojet with reduction gearing as described in the introduction and including a transmission member 3 of the invention.

This transmission member 3 comprises an epicyclic gear train 30 analogous to that described in the introduction with reference to FIG. 2.

It should be observed in particular that in this example the ring 31 is secured to the casing 60 via flexible shrouds 61, the planet carrier 35 is coupled to the fan shaft 2a to drive the fan 2 via a connection that is stiff, and the sun gear 32 is coupled flexibly to a fluted end 10a of the low pressure shaft 10.

Figure 3:
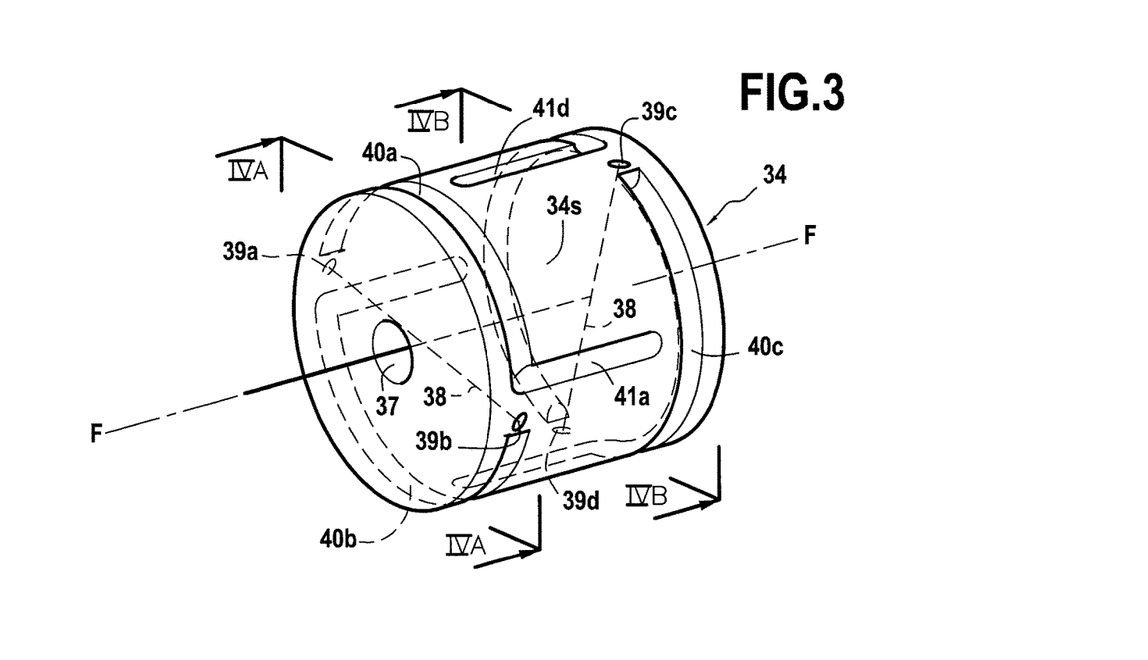
FIG. 3 is a perspective view of a spindle.
Figure 4A:
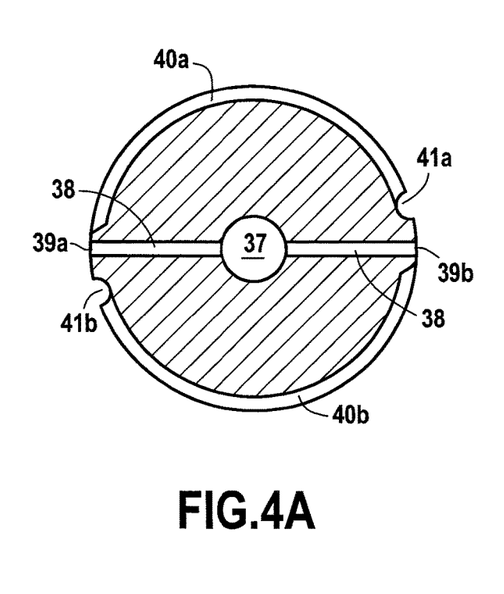
FIG. 4A is a section view on plane IVA of FIG. 3.
Figure 4B:
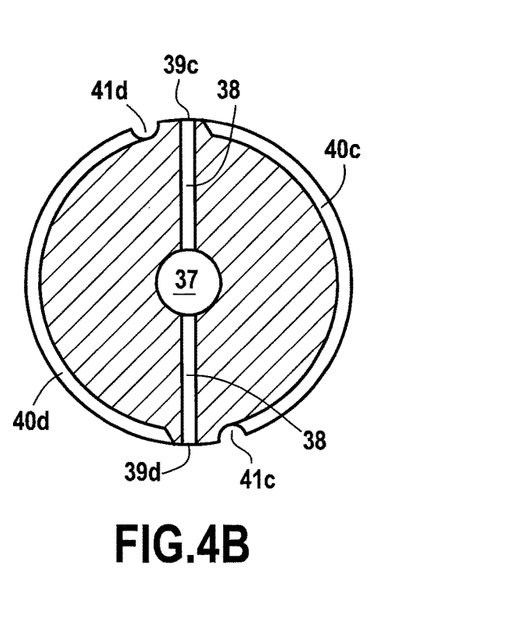
FIG. 4B is a section view on plane IVB of FIG. 3.

In this example of the invention, and as can be seen more clearly in FIGS. 3, 4A, and 4B, each of the spindles 34 of the planet gears 33 has an oil reception chamber 37 in fluid-flow connection with the gap 36 forming the smooth bearing via channels 38 that pass through the spindle 34 and open out via injection orifices 39a-39d referred to as oil admission orifices.

The spindle 34 has first and second oil admission orifices 39a and 39b situated diametrically opposite in a first radial plane IVA extending close to a first end of the spindle 34; it also has third and fourth oil admission orifices 39c and 39d situated diametrically opposite in a second radial plane IVB extending in the proximity of the second end of the spindle 34. The third and fourth orifices 39c and 39d are arranged so as to be offset by 90° relative to the first and second orifices 39a and 39b, i.e. the straight line connecting together the third and fourth orifices 39c and 39d is orthogonal to the straight line connecting together the first and second orifices 39a and 39b. The orifices 39a-39d are thus provided respectively at 0°, 90°, 180°, and 270° around the axis F of the spindle 34.

Each orifice 39a-39d opens out in the surface of the spindle 34. Circumferential grooves 40a-40d are also provided in the surface of the spindle 34. Each circumferential groove 40a-40d extends from the immediate vicinity of an oil admission orifice 39a-39d in the same radial plane as that orifice: more precisely, the upstream end of a circumferential groove 40a is arranged immediately downstream from the corresponding orifice 39a, with less than 5° of difference therefrom, but nevertheless without the orifice 29a opening out directly into the groove 40a. In this reduction gearing, the gear 33 revolves clockwise about the spindle 34: the upstream end of the circumferential groove 40a is thus arranged immediately after the orifice 29a in the clockwise direction.

The circumferential groove 40a-40d associated with a given orifice 39a-39d extends to a zone situated upstream from the other orifice 39b, 39a, 39d, 39c in the same radial plane IVA or IVB: more precisely, its upstream end is arranged in the range 10° to 15° further upstream than said other orifice 39b, 39a, 39d, 39c, i.e. specifically in the range 10° to 15° traveled in the anticlockwise direction. Each circumferential groove 40a-40d thus extends over about 160°.

Furthermore, each circumferential groove 40a-40d is extended at its downstream end by a longitudinal groove: the longitudinal grooves 41a and 41b extend longitudinally from the circumferential grooves 40a and 40b towards the plane IVB, but without reaching it; the longitudinal grooves 41c and 41d extend longitudinally from the circumferential grooves 40c and 40d towards the plane IVA, but without reaching it.

The transmission member 3 also has an oil distributor 50 for distributing lubricating oil from an oil feed 64 provided in the stator to the bearings 36 of the planet gears 33.

Such oil distributors are known: in this example, the distributor may be analogous to that described in the French patent application filed under the No. 13/58581. Under such circumstances, the distributor is not described again in detail. It suffices to know that it comprises a rotary portion that is driven to rotate together with the planet carrier 35, that recovers oil from the stator, and that transfers it to the oil reception chambers 37 of the spindles 34 via connection ducts.

Figure 5A:
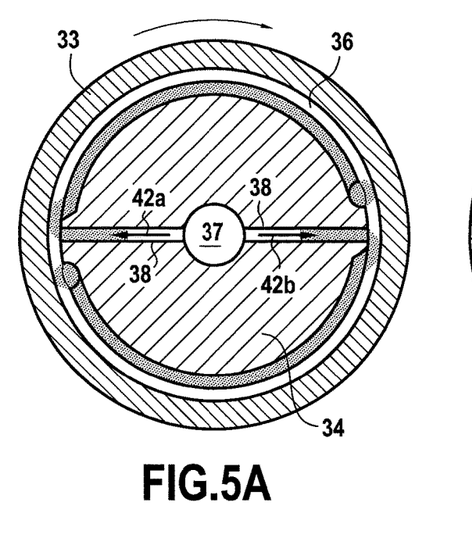
FIGS. 5A and 5B show lubricant feed in the planes IVA and IVB respectively while the spindle is centered.
Figure 5B:
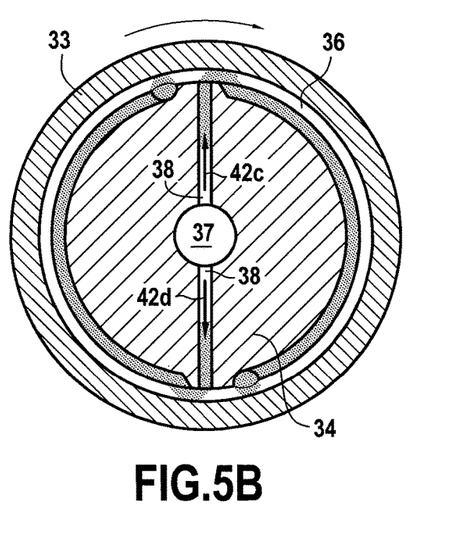

The operation of the balancing system of this fluid bearing is described below with reference to FIGS. 5A, 5B, 6A, and 6B. In FIGS. 5A and 5B, the gear 33 is correctly centered around its spindle 34. As a result, no pinching zone appears in the gap 36: the distance between the surface 34s of the spindle 34 and the inside surface of the central cavity in the gear 33 is constant all around the spindle 34. Under such conditions, oil spreads equally in the channels 38 so that the oil flow rate 42a-42d as injected via the orifices 39a-39d are equal.

Oil thus escapes from each orifice 39a-39d and spreads uniformly in the circumferential grooves 40a-40d and in the longitudinal grooves 41a-41d in such a manner that the centering of the gear 33 is unaffected.

Figure 6A:
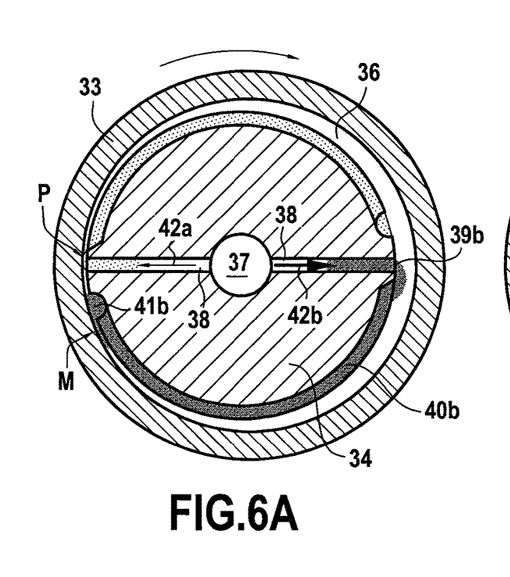
FIGS. 6A and 6B show lubricant feed in the planes IVA and IVB while the spindle is off-center.
Figure 6B:
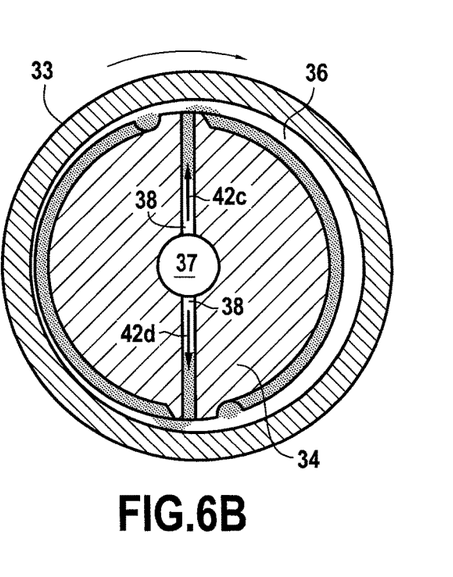

FIGS. 6A and 6B show the situation in which the gear 33 is off-center relative to the spindle 34: the gear 33 is located too far to the right relative to the spindle 34, such that a pinch zone P is present on the left of the spindle 34. Because of this pinching, the section of the passage at the outlet from the orifice 39a is reduced, thereby reducing the oil flow rate 42a escaping from this orifice 39a. Under such circumstances, since the flow rate at which oil enters into the oil reception chamber 37 is constant, the oil flow rates 42b-42d escaping from the other orifices 39b-39d increase. More particularly, the oil flow rate increases mainly through the orifice situated opposite from the pinch zone P, specifically the orifice 39b, insofar as the other two orifices 39c and 39d are also subjected to a small reduction in their through sections caused by the gear 33 being off-center. Consequently, the oil flow rate 42b from the orifice 39b increases significantly, and a larger quantity of oil is delivered by the circumferential groove 40b and the longitudinal groove 41b into the zone M situated immediately upstream from the pinch zone P. As a result, an increased quantity of oil is applied to the inside surface of the gear 33 as it passes through the upstream zone M immediately before reaching the pinch zone P, thereby reducing any risk of friction. In addition, the greater quantity of oil present in this zone makes it possible to enlarge the pinch zone P, thereby tending to recenter the gear 33 about the spindle 34.

Figure 7:
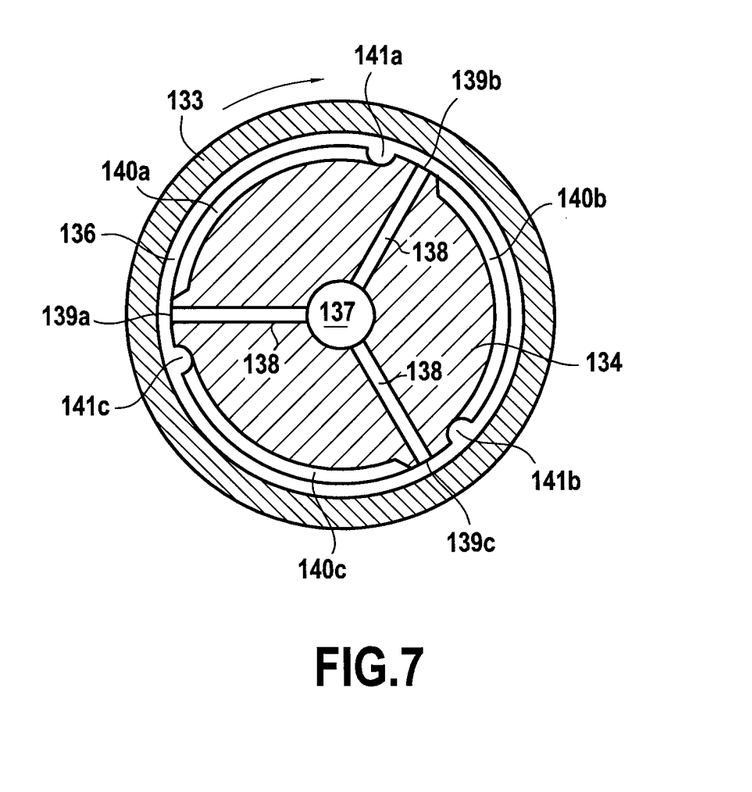
FIG. 7 is a section view showing a second embodiment.

FIG. 7 shows a variant embodiment in which the spindle 134 has three oil admission orifices 139a, 139b, and 139c in a given radial plane, instead of two. These three orifices 139a-139c are situated equally around the axis A, i.e. they are situated every 120°. In analogous manner to the above example, the spindle 134 may have three other oil admission orifices situated in a second radial plane and phase-offset by 60° relative to the orifices 139a-139c in the first radial plane.

In a manner analogous to the first example, circumferential grooves 140a-140c are provided in the surface of the spindle 34 and they extend to a zone situated upstream from the orifice in the clockwise direction. Furthermore, in analogous manner, each circumferential groove 140a-140c is extended at its downstream end by a longitudinal groove 141a-141c.

Figure 8A:
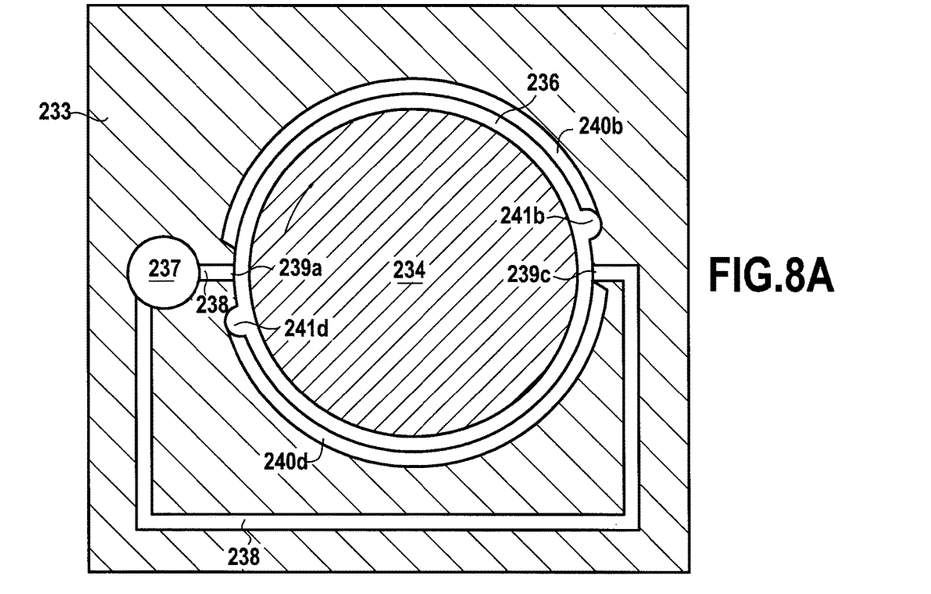
FIGS. 8A and 8B are section views in two different planes showing a third embodiment.
Figure 8B:
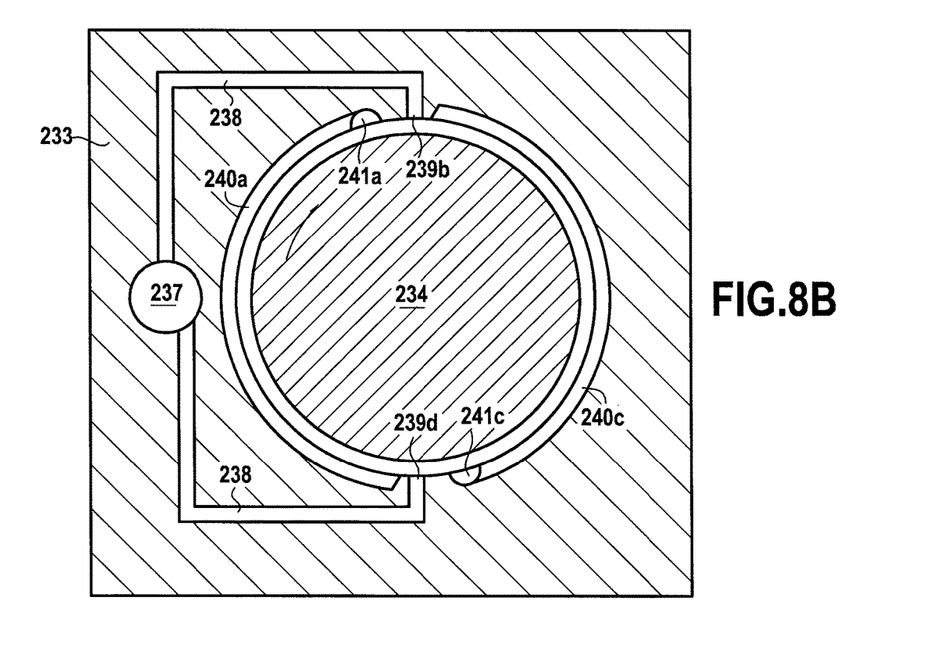

FIG. 8 shows a third embodiment in which the stationary part is a bearing surface 233 within which a shaft 234 rotates. In such an example, since the stationary part is the outer part, the lubricant distribution network is provided within this part. In spite of this difference, the lubricant distribution network is entirely analogous to that of the first example: the inside surface of the cavity of the bearing surface 233 is thus provided with two oil admission orifices 239a and 239b in a first radial plane, and two oil admission orifices 239c, 239d in a second radial plane at a phase shift of 90°; each of these orifices 239a-d is followed by a circumferential groove 240a-d and by a longitudinal groove 241a-d.

The embodiments described in the present disclosure are given by way of non-limiting illustration and a person skilled in the art can easily, in the light of this disclosure modify these embodiments or envisage others while remaining within the ambit of the invention.

Furthermore, the various characteristics of these embodiments may be used singly or they may be combined with one another. When combined, these characteristics may be combined as described above, or in other ways, the invention not being limited to the specific combinations described in the present disclosure. In particular, unless specified to the contrary, any characteristic described with reference to any one embodiment may be applied in analogous manner to any other embodiment.

The invention claimed is:

1. A mechanical assembly comprising a first part provided with a cylindrical cavity;
   a second part having at least one cylindrical portion engaged in the cylindrical cavity of the first part, a gap separating the cylindrical portion and the wall of the cylindrical cavity so as to allow relative movement in rotation between the first and second parts; and
   a lubricant distribution network configured for feeding said gap with a fluid lubricant so as to form a fluid bearing;
   wherein a first surface selected from the inside surface of the cylindrical cavity of the first part and the outside surface of the cylindrical portion of the second part is provided with at least first and second lubricant admission orifices that are spaced apart from each other by not less than 120° about a main axis of the first surface; and
   wherein the first surface also presents at least one first circumferential groove extending circumferentially from the vicinity of the first lubricant admission orifice over at least 100° and in the direction of relative rotation of the second of said surfaces relative to the first surface, the upstream end of the circumferential groove being disjoint from the first lubricant admission orifice in such a manner that said first lubricant admission orifice does not open out into the bottom of said circumferential groove, and a second circumferential groove extending circumferentially in the direction of relative rotation of the second of said surfaces relative to the first surface, from the vicinity of the second lubricant admission orifice over at least 100°.

2. An assembly according to claim 1, wherein the first part is a gear and the second part is a hub, said gear rotating about said hub.

3. An assembly according to claim 1, wherein the first surface is the outside surface of the cylindrical portion of the second part and the second surface is the inside surface of the cylindrical cavity of the first part.

4. An assembly according to claim 3, wherein the cylindrical portion of the second part includes a lubricant reception chamber configured to receive lubricant from a lubricant source and in fluid flow connection with the lubricant admission orifices.

5. An assembly according to claim 1, wherein the first surface includes in a first transverse plane first and second lubricant admission orifices that are diametrically opposite.

6. An assembly according to claim 1, wherein the upstream end of the circumferential groove is distant from of the first lubricant admission orifice by less than 10°.

7. An assembly according to claim 1, wherein a circumferential groove extends circumferentially from the vicinity of each lubricant admission orifice over at least 160° in the direction of relative rotation of the second of said surfaces relative to the first surface.

8. An assembly according to claim 1, wherein the angular distance between the downstream end of the circumferential groove and a second lubricant admission orifice lies in the range 5° to 20°.

9. An assembly according to claim 1, wherein the first surface also presents at least one longitudinal groove extending longitudinally from the downstream end of a circumferential groove.

10. A transmission member of an epicyclic gear train type including the mechanical assembly according to claim 1, wherein the first part of the mechanical assembly is an epicyclic gear train planet gear and the second part is a spindle of an epicyclic gear train planet carrier.

11. A turbine engine including a transmission member according to claim 10.

* * * * *